UNITED STATES PATENT OFFICE.

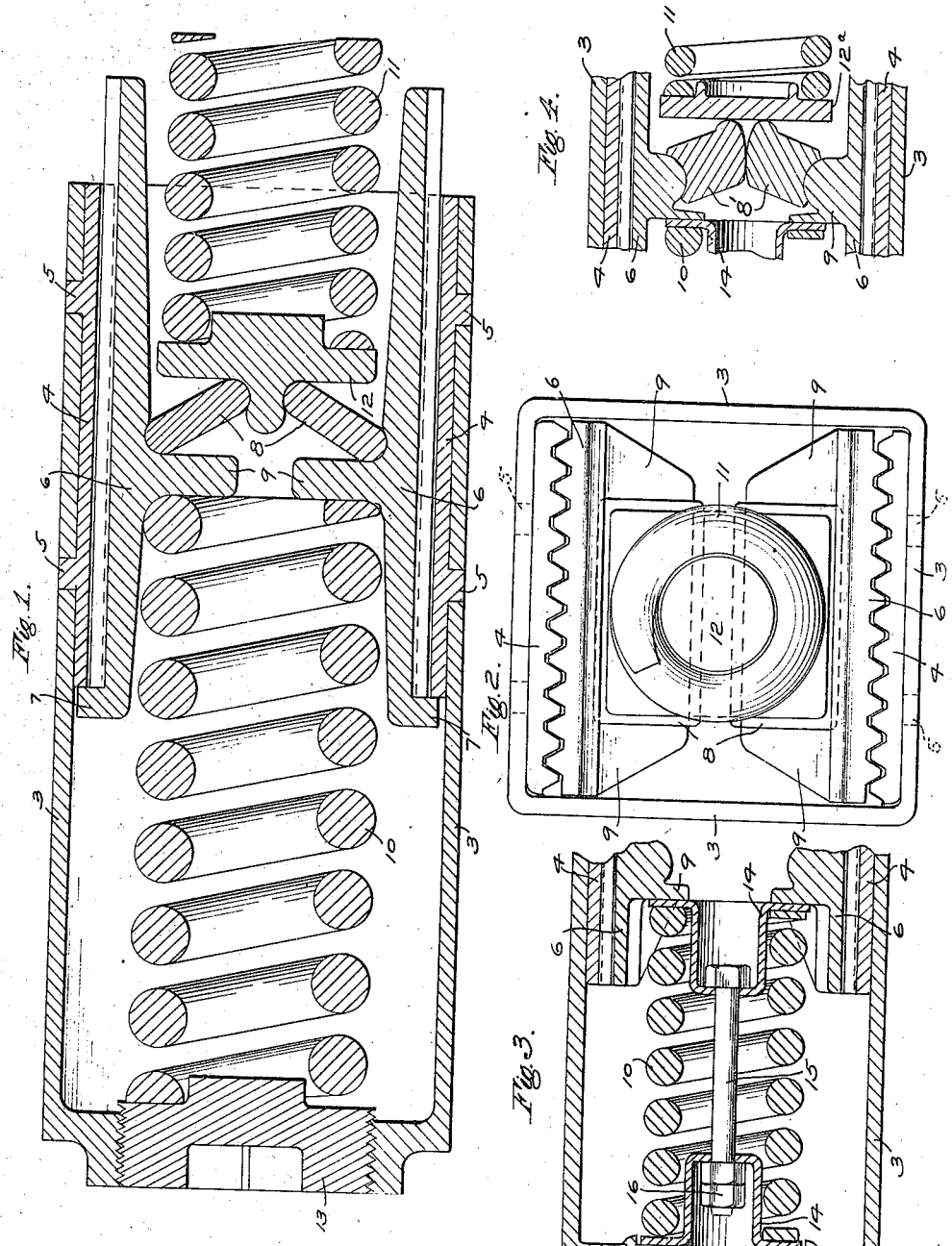

HENRY HERMAN WESTINGHOUSE, OF NEW YORK, N. Y.

FRICTION DRAFT-GEAR.

1,136,073.

Specification of Letters Patent. Patented Apr. 20, 1915.

Application filed March 25, 1907. Serial No. 364,350.

*To all whom it may concern:*

Be it known that I, HENRY H. WESTINGHOUSE, a citizen of the United States, residing at New York, in the county of New York and State of New York, have invented new and useful Improvements in Friction Draft-Gear, of which the following is a specification.

This invention relates to yielding resistance mechanism for transmitting stresses between members having a limited relative movement, and is particularly adapted to be applied as a railway draft and buffing appliance for transmitting draft and buffing strains between the draw bar and the framing of the car or truck and for absorbing and dissipating the sudden shocks and jars to which the draft rigging is subjected in the ordinary running and shifting of railway cars.

The object of my present invention is to provide improved mechanism having a combined friction and spring resistance which shall be extremely simple in construction, inexpensive to manufacture, and efficient and durable in its practical operation.

In the accompanying drawing; Figure 1 is a longitudinal section of a yielding resistance mechanism embodying my improvements; Fig. 2 an end view of the same; Fig. 3 a sectional view of one end of the apparatus illustrating a modified construction for imparting an initial compression to the main resistance spring; and Fig. 4 a sectional view of a portion of the apparatus illustrating a modified form of toggle or cam lever mechanism.

My improvement comprises a combined spring and friction device, in which a preliminary resistance spring is employed for receiving and transmitting the lighter or preliminary stresses and acts on an expanding mechanism to force the friction elements into engagement with each other, and a main resistance spring which opposes the relative movement of the friction elements during the compression of the preliminary spring and then acts in conjunction with the frictional resistance to absorb and transmit the greater shocks and stresses.

As shown in the drawing, the friction elements may be conveniently arranged in the form of a casing 3 having friction surfaces, and friction strips, or members, 6, adapted to slide in said casing and having coöperating friction surfaces.

The internal friction surfaces may be formed integrally with the casing or may be formed on detachable wear plates 4 rigidly secured to the casing in any suitable manner, as by means of lugs 5 projecting into openings in said casing. In this case new wear plates may be substituted for old ones after the latter have become worn.

For the purpose of increasing the area of the contacting surfaces the friction elements may be provided with counterpart longitudinal ribs and grooves which may be wedge-shaped in cross section and slightly tapered, if desired, thereby greatly increasing the frictional resistance exerted between said surfaces.

The main resistance spring 10 bears upon inwardly projecting flanges 9 of the friction strips or members 6, which are also provided with lugs 7 for engaging the ends of plates 4, or other fixed portion of the casing, to serve as a stop, or stops, for holding the members 6 against further outward movement.

A preliminary spring 11 is employed for resisting the lighter stresses and acts upon an expanding mechanism for forcing the friction elements into engagement with each other with the desired degree of pressure. This mechanism preferably comprises a toggle device having levers 8 inserted between the bearing plate 12 and the friction members 6, the length and angle of such toggle levers being properly designed to give the desired maximum thrust to the friction members when the preliminary resistance spring is fully compressed.

Another feature of my invention comprises a main resistance spring having a certain amount of initial compression in its normal position, and this may be conveniently applied in any desired manner, as by having a large opening in the end of the casing 3, through which the spring 10 may be inserted and then closed by threaded nut 13, which may be screwed up sufficiently to give the main spring 10 the desired amount of initial compression. By means of this construction the main resistance spring normally exerts a certain constant pressure against the friction members 6, holding the same against the stops on the casing and preventing relative sliding movement between the friction elements during the compression of the preliminary spring 11.

Another, and perhaps more durable construction, for imparting an initial compression to the main resistance spring, is shown in Fig. 3, in which means, such as plates 14, are employed at opposite ends of the spring 10 and connected by bolt 15 and nuts 16. In this construction the lugs and stops of the Fig. 1 structure may be dispensed with as the spring is prevented from expanding beyond the point to which it is adjusted by the bolt 15. The plates 14 may be formed with central depressed portions, as shown, to provide recesses for the connecting bolt and nuts during the compression of the main resistance spring.

According to the modification schown in Fig. 4, the toggle levers are made in the form of cam levers 8', which have cam surfaces bearing upon each other and upon the plate 12ᵃ of the preliminary spring 11. With this construction of levers, the cam surfaces may be properly designed to compensate for the wear of the friction elements, so that the lateral thrust, due to the pressure of the preliminary spring under maximum compression, will remain substantially constant, even when the friction plates become more or less worn, and thereby secure the desired maximum amount of frictional resistance throughout the life of the gear.

While the drawing shows the casing as of rectangular shape, and containing only two friction strips, it is obvious that the casing may be of any other shape, if desired, having a greater number of sides and a correspondingly greater number of friction strips, or members.

With the construction as shown my improvement is particularly adapted to be used as a friction draft gear and is applied between the follower plates of the draft rigging of a railway car for transmitting the draft and buffing stresses from the draw bar to the car as one of the follower plates moves toward the other, as is well understood by all familiar with the art.

In the normal position of the parts the friction members 6 project outward beyond the end of the casing, and the preliminary spring 11 extends beyond the ends of the friction members, so that, as one of the follower plates of the rigging begins to move toward the other under a draft or buffing stress, the preliminary spring 11 is the first to be compressed. Under the stress imparted to it during preliminary compression the spring 11 acts through the toggle lever mechanism to expand the friction members and force the frictional surfaces into engagement with the desired pressure, but there will be no sliding movement of the friction members within the casing, as the main resistance spring has sufficient force, due to its initial compression, to hold friction members against the stops and prevent such action until the preliminary spring has been fully compressed and the follower plates bear against the outer ends of the friction strips 6. Further movement of the parts under greater stresses then operate to compress the main resistance spring 10, so that the combined force of the main spring and the frictional resistance between the elements is exerted in opposition to these stresses, thereby giving a high maximum capacity to the mechanism.

Having now described my invention, what I claim as new, and desire to secure by Letters Patent, is:—

In a yielding resistance mechanism, the combination with a casing having friction surfaces, friction members in said casing, and an expanding device for the friction members, of a preliminary resistance spring acting on said expanding device, stops for limiting the movement of the friction members in one direction, a main resistance spring free to expand against the friction members to thereby exert a pressure tending to hold the friction members against said stops, and an adjustable nut bearing against the outer end of the spring, and adapted to be screwed up to place the spring under initial compression.

In testimony whereof I have hereunto set my hand.

HENRY HERMAN WESTINGHOUSE.

Witnesses:
R. F. EMERY,
J. B. MACDONALD.